Patented July 4, 1950

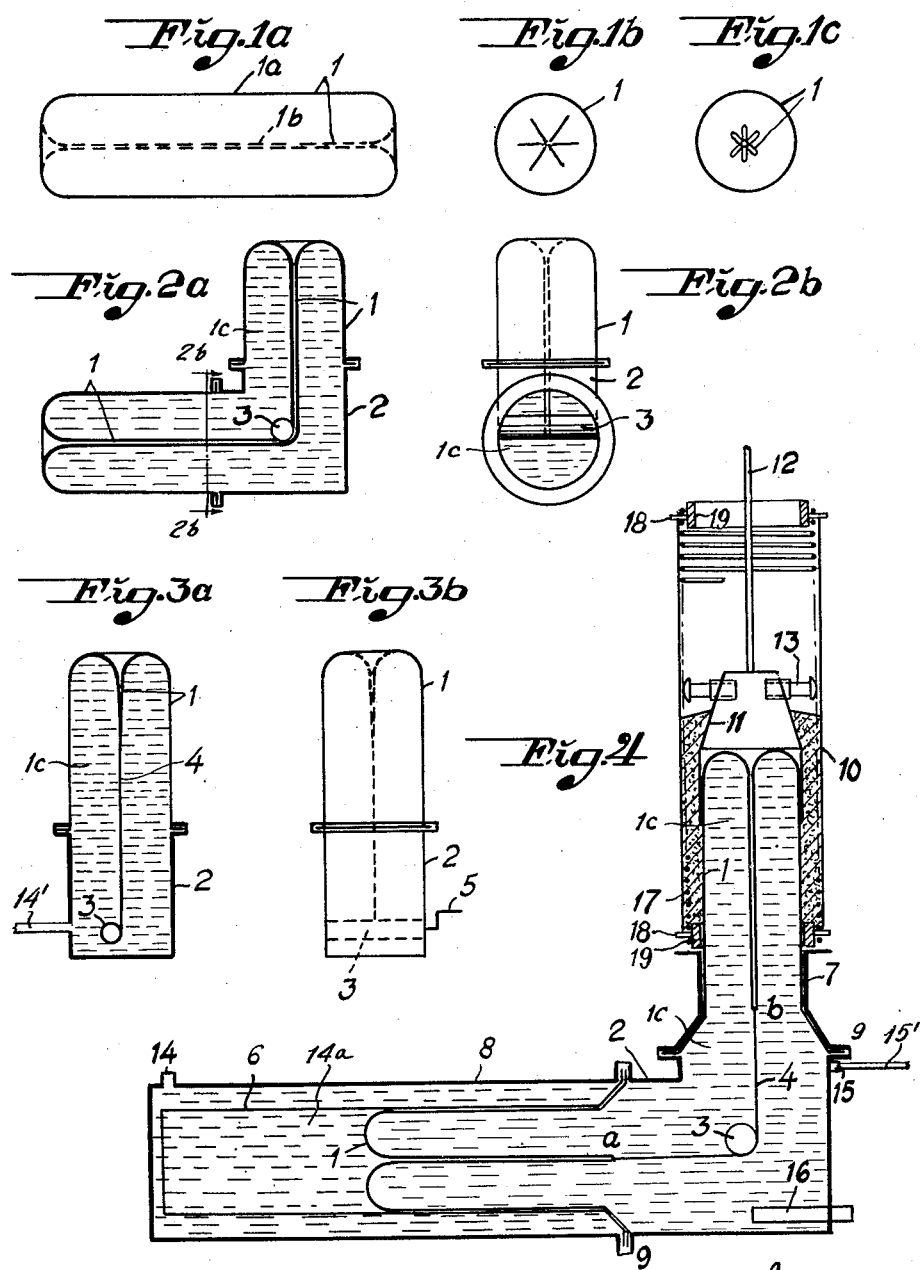

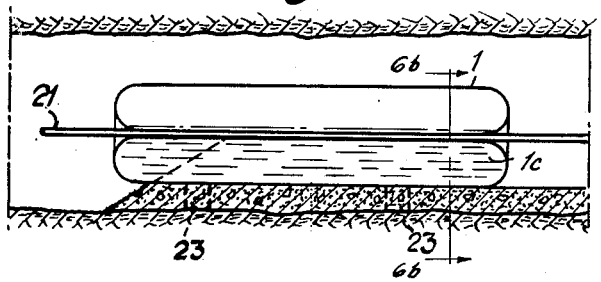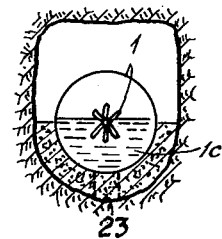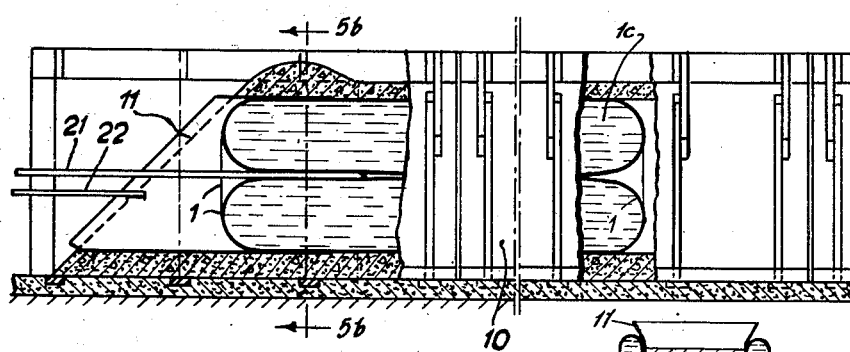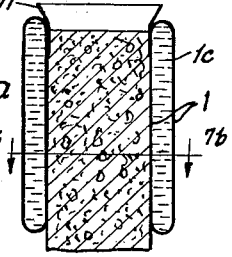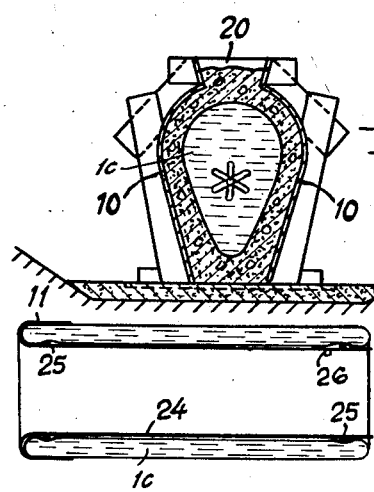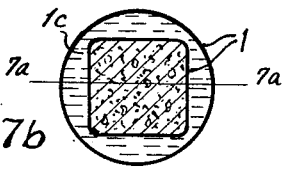

2,513,527

UNITED STATES PATENT OFFICE 2,513,527

APPARATUS AND METHOD FOR MOLDING HOLLOW STRUCTURES OF CONCRETE AND THE LIKE

Olof Viktor Sjödin, Stocksund, Sweden

Application June 5, 1946, Serial No. 674,583

In Sweden June 17, 1940

32 Claims. (Cl. 25—128)

The invention relates to methods and means for moulding objects from a mouldable mass, such as concrete, by means of a movable moulding member, and is a continuation-in-part of my copending application Serial No. 577,642, filed February 9, 1945.

In the first place, the method is characterized by effecting the moulding by aid of a moulding member comprising an envelope or a covering wholly or partly consisting of rubber or other flexible materials and containing antifriction material, said covering having a moulding surface, which is made effective for moulding, successively as a portion of the moulding member is moved in a certain direction, while that portion of the moulding surface, which is effective for moulding, is in non-slidable or immovable contact with the mass, the mouldable mass being supplied to the fore portion of the moulding member as counted in said direction.

By this moulding method, continuous moulding in a wide sense is realized. The advantages are, among other things, avoiding of separation of the moulding mass the possibility of homogeneous moulding with a water-poor moulding mass, easily forcing air and superfluous water from the moulding mass by frontal working of the mass, easily prestraining of reinforcement, a smooth moulding surface not being injured by stripping the covering, the mould erecting operation being able to be effected automatically, and that the whole moulding operation will be simplified.

The invention also relates to the method of carrying out the moulding by applying the mouldable mass to a movable moulding member, comprising a covering wholly or partly consisting of a flexible material and containing antifriction material, said covering having a moulding surface, which, successively, is made effective for moulding at a fore end of the covering, as a portion of the covering is moved in a certain direction, while the covering is stripped at its rear end from the moulded mass, all while the moulding surface is in immovable contact with the moulded mass. When doing this, in the first place, a continuous moulding of long objects combined with an automatical mould erecting and a simultaneous automatical mould stripping is generally realized.

The invention may, among other things, be combined with compressing the moulding mass by utilizing a pressure from the covering against the moulding mass, as also, in combination herewith, prestraining of reinforcements belonging to the moulding object.

The method may, except with new arrangements, be carried out with wholly or partly known arrangements or combinations of known arrangements, which are not earlier used according to the new moulding method. Some examples of embodiments from the multitude of arrangements, which may be used in carrying out the method, are, diagrammatically, illustrated in the accompanying drawings and in the following description.

Figs. 1a, 1b and 1c are a side elevation, an end view and a cross section, respectively, illustrating an example of a covering adapted to be used, in the first place, in continuous moulding of long tubular objects.

Fig. 2a is a longitudinal central section and Fig. 2b a transverse section taken on line 2b—2b of Fig. 2a, illustrating an example of a covering, comprising a flexible portion joined with a rigid tubular part, and adapted to be used, in the first place, as a mould in manufacturing tubes etc. on a large scale in factories.

Figs. 3a and 3b are a longitudinal central section and an end view, respectively, illustrating another example of a flexible covering joined to a reservoir and adapted to be used, in the first place, in manufacturing tubes etc. on a large scale in factories.

Fig. 4 is a longitudinal central sectional view illustrating, more in detail, an example referring to wholesale manufacture of tubes.

Fig. 5a is a longitudinal central section and Fig. 5b a transverse section taken on line 5b—5b of Fig. 5a, illustrating an example of moulding a concrete culvert pipe in situ.

Fig. 6a is a longitudinal central section and Fig. 6b a transverse section taken on line 6b—6b of Fig. 6a views, respectively, illustrating an example of moulding a partial concrete lining in a rock tunnel.

Fig. 7a is a longitudinal central section on line 7a—7a of Fig. 7b, and Fig. 7b a transverse section on line 7b—7b of Fig. 7a, illustrating an example of moulding a solid concrete column.

Fig. 8 is a longitudinal central section illustrating an example of a moulding device adapted to be used in moulding tunnels etc.

The covering 1 shown in Figs. 1a, 1b and 1c forms a closed, filled, in this case wholly cylindrical body, which, while continuously repeating itself may be advanced with its moulding surface in immovable contact with a mouldable mass, for example by exposing one end of it to a thrust. One may conceive this covering as being generated from a piece of a usual rubber tube, by turning the open ends of the tube over themselves and then joining them together. The covering thus obtained may be termed to have an inner undeveloped portion 1a and an outer developed or extended portion 1b, the former portion reaching substantially to the ends of the covering and the latter comprising the outer wall and the end portions by which the inner portion 1a merges into the outer wall.

In the example shown in Figs. 2a and 2b the covering consists of a flexible part 1, the ends of which are joined by means of a rigid tubular part 2, which, for want of space, in this case, is thought to be angular and provided with a roller 3, over which the inner undeveloped portion of the covering may run. Such parts of the undeveloped portion, which, in the use of the covering, are not to be developed may, of course, be replaced by a band, a rod or any other device. The anti-friction filling material such as for example water is shown at 1c.

In the modification shown in Figs. 3a and 3b only one end of the covering 1 is connected to the reservoir 2 to provide a sealed chamber for the filling material, the reservoir having an inlet opening 14' for the filling material 1c. The other end is shut and elongated with a flexible wire 4 or another corresponding part, that may, for example, be wound round a roller 3 with a crank 5. The covering itself may also, of course, be wound round the roller or be advanced in other ways.

In the embodiment relating to the manufacture of tubes of concrete, asphalt concrete, asbestos cement etc., which is illustrated in Fig. 4, the covering, intermediate rigid tubular portion, filling material and roller are designated as in Figs. 2a and 2b. The portion between a and b is here thought to be a flexible wire. With 6, 7 and 8 are designated an inner tube open at the left end and two end pieces respectively, the pieces 6 and 7 being designed to correspond to the inner diameter of the moulded tube. The ends of the covering are fastened between two pairs of flanges 9. The outer mould is designated with 10. The mouldable mass is successively supplied frontally at a circular premoulding guide device 11, open at the rear end and adapted to work the mouldable mass by vibrating its fore portion, and being advanced by a pulling means 12, while it is guided relatively the outer mould by guide devices 13. Simultaneously, the moulding surface of the covering is continuously generated immediately behind the guide device by developing the inner portion which may be effected by admitting water 14a through an opening 14 in the closed tube 8. The closed chamber confined by the ends of the covering is also filled with water 1c introduced through a valve or another filling device 15 connected to a source of pressure, shown as a pipe line 15' which may supply for example pressure air. In order to accelerate the hardening, the moulding mass may be heated, for example, by heating the water with a heating element 16. After the concrete tube has been moulded, the mouldable mass may then be compressed simply by increasing the water pressure in the covering by opening the valve 15 to thereby connect the water filled interior of the covering with the source of pressure, after the top end of the tube has been covered with a sealing lid or the like. By providing suitable slots in the outer mould or other channels superfluous water may then be effectively forced out from the concrete mass. However the frontal moulding and vibrating enabled by this moulding method makes it possible to use a water-poor concrete practically without water in excess, thus making it possible to avoid the washing out of the cement by using water in excess. By further providing an annular reinforcement 17 having sufficiently tight turns and arranging the outer mould elastic or in other way yielding to the pressure from the covering a prestraining of said reinforcement may at the same time be obtained simply by further increasing the pressure in the covering. Also prestraining of longitudinal reinforcements may be effected, for example by anchoring said reinforcement at an end lid engaged by the covering. Any relation between the annular and longitudinal prestraining forces may also be obtained by providing a sufficiently tightly wound helically shaped reinforcement anchored behind pins 18 at special end rings 19 or attached to other fixed points outside the moulded mass.

The tubes may at once undergo pressure testing by pressing water or other pressure medium into the tube by an aperture in the above-mentioned lid, which for this purpose, is provided with a ring of rubber or other tightening means between the lid and the end of the tube. The opening 14 is then also opened, and thus the covering will be stripped from the tube and, simultaneously, the tube be filled with water. The opening 14 is shut just before the covering is completely stripped, whereby the covering itself forms an end-tightening means in the lower end of the tube. The desired test-pressure is then applied for example through the aperture in the lid.

In the embodiment illustrated in Figs. 5a and 5b the moulding takes place in an outer mould 10, in which the covering 1 is located and successively advanced during the moulding operation. Concrete is supplied in the portion 20 of the mould open at the top, while advancing the covering with a rod 21 spaced in the opening in the inner portion of the covering and retained by friction. As soon as the rod must be brought back into the opening, this may be done, for example, by beating or vibrating the rod. This may be facilitated by introducing compressed air between the rod and the covering. At the front end of the covering, as seen in the moulding direction, is a premoulding member constituting a guide ring 11 engaging the covering and being advanced in connection with the covering by means of a pulling device 22.

In the example illustrated in Figs. 6a and 6b the covering 1 serves as an inner mould and the rock wall as an outer mould, and concrete mass is supplied between these moulds, suitably more or less at the fore part of the covering, while successively advancing the latter. A rope 21, which may be endless, is employed for advancing the covering, said rope being carried through the covering and in frictional engagement with the inner wall thereof analogous to the rod in Fig. 5a. The covering is partly filled with water 1c corresponding to the height of the lining and spaced at a suitable distance from the rock by concrete blocks or other distance means 23, which may be embedded in the structure. The covering may also be guided in an entirely free-floating manner in the concrete mass, for example, by pressing the rope 21 vertically and laterally during the moulding operation.

In the example illustrated in Figs. 7a and 7b, the covering 1 serves as outer mould. The mouldable mass is supplied frontally at a premoulding member mounted at the front end of the covering and comprising a sheet metal tube 11 formed to correspond to the moulding section, and which is advanced together with the covering as the moulding operation proceeds.

In the example illustrated in Fig. 8, the covering is mounted round a core 24, which is continued by a guide ring 11 at the front end. 25 designates two annular enlargements of the core located at the ends thereof. Air or other antifriction material is introduced between the core and the covering through a valve or the like 26, which causes the covering to rise from the core and the friction to be reduced. In this way, the covering and the core may be advanced parallelly, for example, by exposing the rear end of the moulding member to a thrust. The friction between the covering and the core may also be reduced by roller bodies or the like.

In connection with the use of a premoulding member located outside or inside the covering at the fore end of the covering and fitted to the desired moulding contour, the covering, in first place, may be used as inner mould by moulding any closed or open objects. By similarly guiding the inner side instead of the outer side of the covering by a premoulding member analogous arrangements may be used also as an outer mould in moulding tubular objects, solid pillars etc. Similar methods and arrangements, which are illustrated in the drawings for vertical moulding, may also be used in other more or less horizontal moulding and then to advantage also at open sections such as channels, beams etc.

By making use of a high pressure in the filling material, in connection with a continuous frontal moulding, a continuous compression of the moulded mass as also a continuous prestraining of a sufficiently close tubular sheet metal, helical, or otherwise ring-shaped reinforcement may be reached successively with the gradual progress of the moulding, as for example in moulding the culvert pipe in Fig. 5a. In that case the covering ought to be elastic and the outer mould yielding and suitably wholly closed, and the moulding mass should be supplied frontally with a rotary screw or another feeding device. In continuous moulding in situ of pipe lines etc., the outer mould may also be constructed as a sliding mould, whereby earth or filling material is successively refilled round it, as the moulding advances. In connection with a filling device for the moulding mass, such as a funnel placed at the fore end of an above mentioned feeding device, the invention may in this way be employed in continuous moulding, also with prestraining, of pipe lines without first cutting ditches.

The covering may also be used for the injection into cracks and simultaneous introduction of a small prestraining in old reinforced pipe lines. In that case the cracks are widened by introducing a covering, for instance of the type according to Fig. 1, into the pipe and the mass is injected into the cracks according as the covering is advanced.

Particularly, in tunnels in earth or rock material or in subwater tunnels or other structures, where the excavated material is to be carried through the covering, or where the frontal working place from other reasons must be available from back, the covering in general ought to be located so as to surround a tubular more rigid core or a corresponding arrangement localizing the surfaces of the covering in a desired position, for example as shown in Fig. 8. In order to gain the advantage of being able to advance the covering and said core at the same speed, without successively being separated, special steps may be taken to reduce the friction between the covering and the core. This may be effected, for example, by using rollers or introducing air or another antifriction material between the core and the covering. The compressing and prestraining steps may also in such works be taken analogous as is above described.

The covering may be manufactured from any kind of elastic or non-elastic material being sufficiently tight to maintain the filling material and allowing the generation of the moulding surface of the covering according to the invention. If the covering is elastic in the transversal direction, it can follow a successive variation of the moulding section effected in the premoulding member, which is actual for example at curves in railway tunnels. Such a variation may also be reached by initially manufacturing the covering with a non-circular section, as, for example, a conical section. In case of a covering intended for continuous moulding and prestraining in large, long objects, such as tunnels, it may be suitable to make the covering elastically yielding in the transverse direction, while, in the moulding direction, the covering may be reinforced, for example, with flexible wires to take up the end pressure in the covering.

The successive generation of the moulding surface of the covering may be reached in various ways. For example, a pressure from back or a suction from before, as seen in the moving direction, may be imparted to the covering. Another example is to place a rod or another propelling device at the covering in such a way, that an inner undeveloped part of the covering is fastened to said device by the friction of the pressure from the filling material. The friction can be reduced by introducing compressed air at the contact surface of the covering to said propelling device as is remarked above as to tunnel works. The covering or the premoulding member may be guided at will by any suitable guide devices but can also to advantage be guided in an entirely free-floating manner in the moulding mass by exposing the front end of the covering or the premoulding member to a transverse force for example as described with reference to Fig. 6a.

The filling material in the covering may comprise any antifriction materials, thus, besides air, water, or other gases and more or less viscous liquids, also solid materials as, for example, in an embodiment, where the filling material consists of a rigid tubular metal core greased with soap or the like thus, at the same time, constituting a guiding device for the covering. Particularly in moulding with a viscous material, the filling material may comprise a liquid having a specific gravity substantially equal to that of the moulding mass. In moulding with concrete, for example, a water solution of zinc chloride may be suitable as such liquid. In case of vibration of the moulding mass during the moulding operation the stability of the moulded mass may be improved by, for example, vibrating the moulding mass only at the front end of a rigid guide ring and damping the vibrations at the rear portion of the ring. Generally, increase of the pressure from the covering to the moulding mass may be effected by increasing or evaporating the filling material, but may also be reached in other ways, for example, by applying the covering on a conical or otherwise tapering core or applying a tubular tapering core in the filling material, where an increased pressure may also be reached purely by mechanical means by exposing an end of the core to an outer force.

In this invention the terms "moulding mass" and "mouldable mass" also refers to injected masses and any other masses, that remain stable in the position formed by the mould at that moment, where the mould is brought to leave the mass.

From the above it is clear that this invention may be generally used within a very wide region in moulding of inner and outer moulding surfaces of work in situ as well as in case of manufacture in factories.

What I claim is:

1. A method of moulding objects from a mouldable mass by aid of a moulding member having a tubular envelope enclosing an antifriction material, comprising the steps of making a moulding surface of the envelope successively effective for moulding by moving a flexible portion of the envelope in a certain direction, supplying mass to the fore portion of the moulding member as counted in said direction, and moulding the mass while keeping a portion of the effective moulding surface of the envelope in non-slidable contact with the moulded mass.

2. A method of moulding objects from a mouldable mass by aid of a moulding member having a tubular covering containing an antifriction material and presenting a moulding surface to the mass, comprising the steps of applying the mass to the moulding member, moulding the mass, and stripping a flexible portion of the covering from the moulded mass at one end of the covering, while the moulding surface is successively restored at the other end of the covering, all while portions of the moulding surface of the covering are maintained in non-slidable contact with the moulded mass.

3. A method of moulding objects from a mouldable mass by aid of a moulding member having a tubular covering containing an antifriction material and a premoulding member, the method comprising the steps of moving the pre-moulding member and a flexible portion of the covering in a certain direction and thereby making a surface of the covering successively effective for moulding at the fore end of the covering as counted in said direction, applying mass for moulding at the premoulding member, as said premoulding member is advanced at the fore end of the covering, and moulding the mass by the premoulding member and the moulding surface of the covering made effective for moulding, while said surface is maintained in non-slidable contact with the moulded mass.

4. A method of frontal moulding of objects from a mouldable mass by aid of a moulding member having a tubular covering containing an antifriction material and presenting a moulding surface to the mass, comprising the steps of making the moulding surface of the covering successively effective for moulding by moving a flexible portion of the covering in a certain direction, applying mass to the fore portion of the moulding member and moulding the mass by the moulding surface of the covering, while maintaining the moulding surface having been made effective for moulding in non-slidable contact with the moulded mass, and successively frontal working the mass at the front end of the moulding member.

5. A method of frontal moulding of objects from a mouldable mass by aid of a moulding member having a tubular covering containing an antifriction material and presenting a moulding surface to the mass, comprising the steps of making the moulding surface of the covering successively effective for moulding by moving a flexible portion of the covering in a certain direction, applying mass to the fore portion of the moulding member as counted in said direction, and moulding the mass by the moulding surface of the covering, and compressing the mass by exposing the moulded mass to a pressure from the covering.

6. A method of moulding objects from a mouldable and hardening mass by aid of a moulding member having a tubular covering containing an antifriction material and presenting a moulding surface to the mass, comprising the steps of mounting means to reinforce the object to be moulded making the moulding surface of the covering successively effective for moulding by moving a flexible portion of the covering in a certain moulding direction, applying mass to the moulding member and moulding the mass by the moulding surface of the covering, while maintaining the moulding surface having been made effective for moulding in non-slidable contact with the moulded mass, and prestraining the reinforcing means by applying tension thereto and maintaining that prestraining tension until the moulded mass has hardened sufficiently to take up the prestraining forces.

7. A method of frontal moulding of tubular objects from a mouldable mass comprising the steps of mounting an annular reinforcement being sufficiently impenetrable to the used moulding mass, mounting in the inner of said reinforcement a movable moulding member having an inner and outer walled flexible envelope enclosing antifriction material and presenting a moulding surface for the object, applying and frontally working a plastic water-poor moulding mass at the front end of the moulding member, successively moulding the object while making the moulding surface of the envelope effective for moulding by continuously developing the inner flexible wall into the outer flexible wall at the front end of the moulding member, compressing the mass between the envelope and the annular reinforcement by exposing the moulded mass to a pressure from the envelope and thereby prestraining the reinforcement.

8. A method of moulding objects from a mouldable and hardening mass by aid of a moulding member having a tubular covering containing an antifriction filling material and presenting a moulding surface to the mass, comprising the steps of making the moulding surface of the covering successively effective for moulding by moving a flexible portion of the covering in a certain direction, applying mass to the moulding member and moulding the mass by the moulding surface of the covering, while maintaining the moulding surface having been made effective for moulding in non-slidable contact with the moulded mass, and heating the filling material in order to accelerate the hardening of the mass.

9. In an arrangement for moulding objects from a mouldable mass, a covering having a tubular wall of flexible material, means to move a portion of said wall of the covering for making it successively effective for moulding and means to retract another flexible portion of the covering from the mass after moulding, the effective portion merging in a retracted portion at one end of the covering and another portion merging in the effective portion at the other end of the covering, the effective portions further being adapted to non-slidably engage the mass during the moulding operation.

10. A moulding core comprising a tubular member of flexible material having inner and outer walls, said inner wall merging continuously into said outer wall at one end of said member, and said outer wall merging continuously into said inner wall at the other end of said member upon relative longitudinal displacement between said walls.

11. A moulding core as defined in claim 10 wherein said tubular member includes a rigid tubular portion intermediate the ends thereof.

12. In an arrangement for frontally moulding objects from a mouldable mass, a covering having a movable portion with a tubular wall of flexible material, means to move said portion of the covering for making it effective for moulding by successively merging the movable portion in an immovable portion at the fore end of the covering, as counted in the moulding direction, a premoulding member fitted to the effective portion at the fore end of the covering and adapted to premould and work the mass, and means to advance the premoulding member at the fore end of the covering during the moulding operation.

13. In an arrangement for moulding objects from a mouldable mass, a covering having a flexible tubular wall adapted to form a moulding surface, said wall having a portion effective for moulding, while in non-slidable contact with the mass, and another portion ineffective for moulding but adapted to be made successively effective for moulding at an end of the covering, a reservoir communicating with the covering to form a closed chamber together with the covering for a filling material, and means to develop the ineffective portion of the wall at the said end by increasing the pressure from the filling material to said end so as to make it effective for moulding.

14. In an arrangement for moulding objects from a mouldable mass, a covering having a flexible tubular wall adapted to form a moulding surface, said wall having a portion effective for moulding, while in non-slidable contact with the mass and another portion ineffective for moulding but adapted to be made effective for moulding successively as the ineffective portion is advanced during the moulding operation, a core surrounded by the covering and maintaining the wall thereof in a desired position, and means to reduce the friction between the covering and the core.

15. In an arrangement for moulding objects from a mouldable mass, a covering having a flexible wall forming a front end, means to move a portion of said flexible wall for making it effective for moulding at the front end of the covering, while another portion of the flexible wall remains in non-slidable engagement with the mass being moulded, and means for imparting vibrations to the mass at the front end of the covering.

16. In an arrangement for frontally moulding objects from a mouldable mass, a covering having a flexible tubular wall forming a front end as counted in a certain direction, means to move a portion of the flexible wall in said direction for making said portion effective for moulding at said front end, and means to apply pressure by the covering to the mass engaging the covering.

17. In an arrangement for frontally moulding tubular objects from a mouldable mass containing a helically arranged reinforcing member, a covering having a flexible tubular wall forming a front end as counted in a certain direction, means to move a portion of the wall of the covering in said direction for making said portion effective for moulding at said front end, while another wall portion having been made effective for moulding remains in non-slidable contact with the mass being moulded, the covering containing a pressure medium, anchoring means for said reinforcement member at the ends of it, and means to increase the pressure in the covering to compress the mass between the covering and the reinforcement and thereby to prestrain said helical reinforcement, both in longitudinal and transversal direction the reinforcement being sufficiently impenetrable to the mass to be able to take up the pressure during the compression.

18. In an arrangement for moulding objects from a mouldable and hardening mass, a covering containing antifriction filling material having a flexible tubular wall forming a front end as counted in a certain direction, means to move a portion of the flexible wall in said direction for successively making said portion effective for moulding at said front end, while another wall portion having been made effective for moulding remains in non-slidable contact with the mass being moulded, and means to heat the filling material in the covering in order to accelerate the hardening of the molding mass.

19. A method of moulding objects from a mouldable mass, comprising introduction of the mass into an outer mould to engage an inner moulding member comprising a tubular covering of flexible material containing an anti-friction material capable of being rolled forth in engagement with the moulded mass, and removing the moulding member by stripping one end portion of the covering from the moulded mass subsequent to hardening thereof while regenerating the moulding member by extending the other end portion of the covering.

20. A method of moulding objects from a mouldable mass comprising introduction of the mass into an outer mould to engage an inner moulding member comprising a tubular covering of flexible material containing anti-friction material and presenting a moulding surface at a fore end as counted in the moulding direction, moving a portion of the covering in said direction and thereby making a moulding surface successively effective for moulding at the fore end of said inner moulding member.

21. A method of moulding objects from a mouldable mass, comprising supply of the mass to the moulding surface of a pre-moulding member, advancing said pre-moulding member in accordance with the supply of the mouldable mass to pre-mould the surface of an object, supporting the pre-moulded surface by an elongated double-walled tubular moulding member having a moulding surface of the same contour as that of said pre-moulding member, and rolling the double walled moulding member forward in accordance with the advance of said pre-moulding member to engage said pre-moulded surface as said pre-moulded member advances along the same.

22. A method of frontally moulding objects from a mouldable mass comprising supply of the mass to the moulding surface of a pre-moulding member, advancing said pre-moulding member in accordance with the supply of the mouldable mass to pre-mould the surface of the object, supporting the pre-moulded surface by a flexible tubular covering as a moulding member having a moulding surface corresponding to that of said pre-moulding member and capable of being extended at its front end while parts of it are in immovable contact with the moulded surface of the mass, and extending the covering forward in accordance with the advance of said pre-moulding member to engage said pre-moulded surface as the pre-moulding member advances in front of the covering.

23. The method of frontal moulding as defined in claim 22 and which includes the further step of vibrating said pre-moulding member to work the mass.

24. A method of frontal moulding of tubular objects from a mouldable mass comprising the steps of mounting a helically wound annular reinforcement anchored at fixed points outside the moulding object and being sufficently impenetrable to the used moulding mass, mounting in the inner of said reinforcement a movable moulding member having an inner and outer walled flexible tubular covering containing anti-friction material and presenting a moulding surface for the object, applying and frontally working a plastic water-poor moulding mass at the front end of the moulding member, successively moulding the object while making the moulding surface of the envelope effective for moulding by continuously developing the inner flexible wall into the outer flexible wall at the front end of the moulding member, compressing the mass between the envelope and the annular reinforcement by exposing the moulded mass to a pressure from the covering and thereby prestraining the reinforcement in such a way that, after hardening the mass and decreasing said pressure, prestraining forces will arise in the moulded object both in longitudinal and transversal direction.

25. An arrangement for moulding objects of a mouldable mass, comprising a moulding member consisting of a covering of flexible material having an outer wall and an inner wall, said walls continuously merging in each other when the covering is rolled forth from a mass supplied thereto, means between said walls maintaining the same in spaced relation, and means to advance and means to guide the covering during the advance thereof.

26. In an arrangement for frontally moulding columns or the like from a mouldable mass, a moulding member comprising inner and outer walls of flexible material, said inner wall forming a moulding surface in the moulding direction and being developed from the outer wall by advance of the latter in such direction as the moulding progresses at the point of development, and a pre-moulding member fitted to the moulding surface of said inner wall and adapted to premould the mass and means to advance the premoulding member at the fore end of the moulding member.

27. In an arrangement for moulding an object from a mouldable mass, a moulding member of flexible material having inner and outer tubular walls, one of said walls forming a moulding surface at one end of said member in the moulding direction and being developed from the other wall at such end by advance of the latter wall in such direction, said advance being accompanied by a redevelopment of the latter at the opposite end of said member.

28. In an arrangement for frontally moulding a tubular object from a mouldable mass, a flexible inner and outer walled moulding member, said outer wall successively forming at one end of said member a moulding surface in the direction of moulding and being developable from said inner wall by advance of the latter in the moulding direction, and a reservoir in communication with said member at the opposite end thereof to form with said member a closed chamber for anti-friction material the pressure from which progressively develops said outer wall at the moulding end of said member.

29. In an arrangement for frontally moulding objects from a mouldable mass, a flexible inner and outer walled moulding member, the end portion of said outer wall forming a moulding surface in the moulding direction and being developed from said inner wall by advance of the latter in such direction as the moulding progresses at said end portion, a second inner and outer walled member structurally similar to said moulding member, a reservoir uniting said members and forming therewith a closed chamber for anti-friction filling material therein, means interconnecting the extremities of said inner walls of said members, and means for developing said outer wall of said moulding member by pressure applied exteriorly to the outer wall of said second member.

30. An arrangement for moulding objects of a mouldable mass, comprising a moulding member consisting of a tubular covering having an outer flexible wall and an inner flexible wall merging continuously in said outer wall, an anti-friction filling between said walls, a pre-moulding member fitted to the front end of the moulding member, means to advance said pre-moulding member to pre-mould the object successively, and means to extend the moulding member along the surface moulded by said pre-moulding member as the latter is advanced.

31. In an arrangement for frontally moulding objects from a mouldable mass, a flexible inner and outer walled moulding member, one of these walls being developed for moulding from the other wall by advance of the latter in the direction of moulding, a premoulding member fitted to the developed end of said member to which the mass is applied, means for advancing said pre-moulding member, means for advancing said member, and means for vibrating said pre-moulding member to work the mass.

32. An arrangement for frontally moulding tubular objects from a mouldable mass comprising, a flexible and elongated inner and outer walled moulding member, an anti-friction filling between said walls, a pre-moulding member fitted to the front end of said moulding member, means to advance said pre-moulding member to premould the object successively, and means engaging the inner wall of said moulding member for correspondingly advancing the latter in the moulding direction to develop the same into said outer wall at the moulding end and simultaneously redevelop said inner wall from said outer wall at the opposite end of said moulding member thereby stripping the latter from the moulded surface.

OLOF VIKTOR SJÖDIN.

REFERENCES CITED

The following references are of record in the file of this patent:

UNITED STATES PATENTS

| Number | Name | Date |
|---|---|---|
| 1,348,332 | Stremel | Aug. 3, 1920 |
| 2,048,253 | Freyssinet | July 21, 1936 |
| 2,102,639 | Mourraille | Dec. 21, 1937 |

FOREIGN PATENTS

| Number | Country | Date |
|---|---|---|
| 388,285 | Germany | Jan. 17, 1924 |
| 355,517 | Great Britain | Aug. 27, 1931 |